(12) United States Patent
Stolte et al.

(10) Patent No.: US 8,978,264 B2
(45) Date of Patent: Mar. 17, 2015

(54) FUEL CELL SYSTEM AND METHOD FOR DRYING OF EXHAUST GAS OF A FUEL CELL SYSTEM

(75) Inventors: Ralf-Henning Stolte, Hamburg (DE); Sebastian Mock, Hamburg (DE); Johannes Lauckner, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 83 days.

(21) Appl. No.: 13/459,571

(22) Filed: Apr. 30, 2012

(65) Prior Publication Data

US 2012/0261512 A1 Oct. 18, 2012

Related U.S. Application Data

(63) Continuation of application No. PCT/EP2010/066034, filed on Oct. 25, 2010.

(60) Provisional application No. 61/256,015, filed on Oct. 29, 2009.

(30) Foreign Application Priority Data

Oct. 29, 2009 (DE) .................... 10 2009 051 212

(51) Int. Cl.
*F26B 11/00* (2006.01)
*B01D 53/26* (2006.01)
(Continued)

(52) U.S. Cl.
CPC ......... *H01M 8/04164* (2013.01); *B01D 53/265* (2013.01); *B01D 2259/4575* (2013.01);
(Continued)

(58) Field of Classification Search
USPC ......... 34/90, 92, 95, 104, 105, 201, 210, 218; 62/68, 80, 340, 515; 429/26, 30, 443, 429/444; 244/134 R; 252/67, 68
See application file for complete search history.

(56) References Cited

U.S. PATENT DOCUMENTS 2,129,565 A * 9/1938 Clay .......................... 244/134 C
2,423,700 A * 7/1947 Hardy ........................ 416/229 R
(Continued)

FOREIGN PATENT DOCUMENTS

DE 102005054885 A1 5/2007
JP 2266198 A 10/1990
WO 2009117586 A2 9/2009

OTHER PUBLICATIONS

Tero Taehti, Suspension Melt Crystallization in Tubular and Scraped Surface Heat Exchangers, Dissertation, Aug. 18, 1972, Hämeenlinna, Finnland.
(Continued)

*Primary Examiner* — Steve M Gravini
(74) *Attorney, Agent, or Firm* — Ingrassia Fisher & Lorenz, P.C.

(57) ABSTRACT

A fuel cell system having an apparatus for gas drying that includes, but is not limited to at least one cooling element with at least one first surface and at least one detachment device. The cooling element is designed to be thermally connected to a heat sink and to come into contact with gas flowing past. The detachment device is movably held relative to the first surface and is designed to detach frozen water from the first surface.

17 Claims, 5 Drawing Sheets

(51) Int. Cl.
   *B64D 37/32*    (2006.01)
   *B64D 41/00*    (2006.01)
   *H01M 8/04*    (2006.01)

(52) U.S. Cl.
   CPC .............. *B64D37/32* (2013.01); *B64D 41/00* (2013.01); *B64D 2041/005* (2013.01); *Y02E 60/50* (2013.01); *Y02T 90/36* (2013.01)
   USPC .......... 34/90; 34/105; 34/210; 34/218; 62/80; 62/515; 429/444; 244/134 R; 252/68

(56) References Cited

U.S. PATENT DOCUMENTS

| | | | | |
|---|---|---|---|---|
| 2,515,341 | A * | 7/1950 | Giguere | 126/271.1 |
| 2,976,935 | A * | 3/1961 | Andrews | 416/20 R |
| 3,533,395 | A * | 10/1970 | Yaste | 126/271.1 |
| 5,832,738 | A | 11/1998 | Shin | |
| 6,585,191 | B2 * | 7/2003 | Andre et al. | 244/134 B |
| 7,135,245 | B2 * | 11/2006 | Standke et al. | 429/436 |
| 7,267,900 | B2 | 9/2007 | Lee | |
| 7,759,011 | B2 | 7/2010 | Hoffjann et al. | |
| 2002/0011075 | A1 * | 1/2002 | Faqih | 62/285 |
| 2002/0112479 | A1 | 8/2002 | Keefer et al. | |
| 2004/0028966 | A1 | 2/2004 | Hibbs et al. | |
| 2004/0229096 | A1 * | 11/2004 | Standke et al. | 429/24 |
| 2005/0235979 | A1 * | 10/2005 | Whittaker | 126/19.5 |
| 2006/0029849 | A1 | 2/2006 | Metzler | |
| 2006/0172676 | A1 * | 8/2006 | Ebner et al. | 454/152 |
| 2008/0070078 | A1 | 3/2008 | Gummalla et al. | |
| 2011/0003224 | A1 * | 1/2011 | Scheibert | 429/434 |
| 2011/0079683 | A1 * | 4/2011 | Stolte et al. | 244/129.2 |
| 2011/0088413 | A1 | 4/2011 | Lampe et al. | |
| 2012/0261512 | A1 * | 10/2012 | Stolte et al. | 244/134 R |
| 2013/0168961 | A1 * | 7/2013 | Stahlkopf et al. | 290/7 |
| 2013/0199218 | A1 * | 8/2013 | Scheibert | 62/80 |

OTHER PUBLICATIONS

International Searching Authority, International Search Report dated Feb. 11, 2011 for International Application No. PCT/EP2010/066034.

German Patent Office, German Office Action dated Apr. 28, 20110 for German Patent Application No. 10 2009 051 212.8.

State Intellectual Property Office of the People'S Republic of China, Office Action in Chinese Patent Application No. 201080057677.9 mailed Apr. 1, 2014.

* cited by examiner

FUEL CELL SYSTEM AND METHOD FOR DRYING OF EXHAUST GAS OF A FUEL CELL SYSTEM

CROSS-REFERENCE TO RELATED APPLICATIONS

This is a continuation of International Application No. PCT/EP2010/066034, filed Oct. 25, 2010, which application claims priority to German Application No. 10 2009 051 212.8, filed Oct. 29, 2009 and to U.S. Provisional Application No. 61/256,015, filed Oct. 29, 2009, which are hereby incorporated by reference in their entirety.

TECHNICAL FIELD

The technical field relates to a fuel cell system with an apparatus for drying exhaust gases of the fuel cell system, to a method for drying exhaust gases of a fuel cell system, and to an aircraft with at least one such fuel cell system.

BACKGROUND

For modern commercial aircraft, occasionally fuel cell systems are conceived or already used in order to handle various tasks. Apart from electricity generation, other tasks can also be carried out, for example rendering a fuel tank inert by introducing the exhaust gases of a fuel cell system. Because of the way a fuel cell operates, the exhaust gas usually contains water vapor. Generally-speaking, if humid gases are used for rendering a fuel tank inert, there is a problem in that fuels, in particular kerosene, are hygroscopic. Furthermore, a bacteria population can form in the tank, which bacteria population could influence sensors for acquiring the fill level of the tank so that acquisition becomes imprecise. Furthermore, within the fuel tank or the fuel itself, ice crystals could form that could result in damage to engine injection nozzles and fuel filters in cruising flight of the aircraft or during below-zero temperatures on the ground. There is thus a requirement for introducing dry gases into the fuel tank in order to be able to render the fuel tank inert.

DE 10 2005 054 885 A1 and US 2007/0111060 A1 disclose a safety system for reducing the danger of explosion of a fuel tank, in which system a protective-gas production device comprises a fuel cell system with a fuel cell, and provides a protective gas which during operation of the fuel cell system is produced by the fuel cell.

In prior art various methods and systems are known that are used for drying gases, in particular air. Thus it would, for example, be possible to carry out adsorption with hygroscopic media, for example silica gel. However, the water absorption capacity of a hygroscopic medium is finite, and consequently after use it would have to be either replaced or regenerated. In particular in an aircraft, replacement leads to pronounced weight problems, and constant emptying and refilling leads to increased maintenance effort. Furthermore, regeneration would be possible with a corresponding heat input, for example, with heated air. However, this would place in doubt the effectiveness of the fuel cell system, because thermal regeneration would require considerable expenditure of energy. If no regeneration is to be carried out, due to the above-mentioned saturation, exhaust gas drying is possible only for a limited period of time. Generally speaking, in such methods dew points, i.e., temperatures, are attained at which there is a state of equilibrium between condensing water and evaporating water, which dew points or temperatures reach far into the double-digit negative region.

A further method for drying air takes place by water transfer with a selective membrane, with the use of a partial pressure differential. To this effect a membrane would be used that separates a gas to be dried from a dry gas, where, due to a partial pressure differential, water is made to pass through the membrane. As an alternative to the dry gas it would also be possible to increase the static pressure on that membrane side on which the gas to be dried is located. The drying performance of this method is limited by the achievable partial pressure differential. Particularly low dew points of a membrane compressed-air dryer are only achieved with the use of quite a high operating pressure and the accompanying high compressor performance necessary.

A further, third, method from prior art for gas drying would take place by cooling the gas to below the dew point, for which purpose basically only a heat exchanger and a heat sink or a cooling medium are required. Following cooling, and for final separation of liquid water from gaseous residual gas, a drip catcher or the like could be used. However, this principle requires quite considerable cooling capacity because liquid product water is present, and the energy released during the phase transition needs to be discharged. The cold used to cool the gas can in part be recovered in a downstream recuperative heat exchanger. Basically, in this arrangement the attainable dew point is limited by the freezing point, because in the design currently in widespread use icing occurring within the heat exchanger can result in the blocking of gas ducts.

Correspondingly, it may be considered at least one object to provide a system for cooling the exhaust gas of a fuel cell system, which system for cooling reduces or entirely eliminates the above-mentioned disadvantages. In particular, it may be considered at least another object to provide a system for drying exhaust gas of a fuel cell system, which system for drying with the use of as little energy as possible makes it possible to dry the exhaust gas as effectively as possible without significantly increasing the complexity of the fuel cell system or its periphery, while at the same time minimizing the additional weight. In addition, other objects, desirable features and characteristics will become apparent from the subsequent summary and detailed description, and the appended claims, taken in conjunction with the accompanying drawings and this background.

SUMMARY

A fuel cell system is provided having an apparatus for drying of exhaust gas of the fuel cell system. The apparatus for drying of exhaust gas of the fuel cell system comprises at least one cooling element with at least one first surface and at least one detachment device.

The cooling element is designed to be thermally connected to a heat sink and to come into contact with gas flowing past the first surface. In concrete terms this means that a cooling element of any shape can be connected in any desired manner with a heat sink in order to be cooled. In this arrangement connection with the heat sink can be carried out in completely different ways. For example, a cooling circuit could be provided that conducts a cooling medium as a heat sink through the cooling element so that heat from the cooling element is dissipated to the cooling medium. At the same time the cooling element could also be designed to establish a mechanical connection with a Peltier element or the like as a heat sink so that, as a result of contact with a cold side of a Peltier element, heat dissipation from the cooling element to the Peltier element, and thus cooling, can take place. Furthermore, it could also be possible to link a cold fluid as a heat sink from any source in any desirable manner with the cooling element so that, as a result of the low temperature of the fluid, cooling of the cooling element takes place. In this arrangement, for example, particularly cold ambient air from the surroundings of an aircraft in cruising flight could be considered, which air can be used either directly or by way of a heat exchanger implemented in the form of an outer-skin cooler. Likewise, the use of liquid hydrogen from a cryogenic tank could be considered as a heat sink, which hydrogen is used as fuel for the fuel cell. In order to operate a fuel cell it is necessary anyway to convert the hydrogen from its liquid form to a gaseous form so that a heat input could be advantageous.

Such a cooling element provides at least an advantage in that the content of water or water vapor of a gas flowing past the first surface of the cooling element freezes and collects on the first surface. With an adequately cold temperature of the cooling element below the freezing point and adequate impingement of the first surface with the gas to be dried, adequate drying of the gas is possible.

The above-mentioned detachment device is movably held relative to the first surface of the cooling element and is designed to detach water that has frozen onto the first surface, and consequently no excessive deposit of ice occurs. This embodiment or other embodiments is not limited to a particular type of detachment device; instead, here too any imaginable detachment devices can be considered. Mechanical detachment elements can be implemented with scraping elements, scraping edges or the like, engage the first surface and mechanically detach ice from the first surface.

The use of a mechanical detachment device also provides at least an advantage in that no saturation effects occur. Furthermore, no special materials need to be fed to the apparatus, which materials would allow the detachment of ice or drying of the gas. Furthermore, a compact design can be anticipated.

In another embodiment of the apparatus, the detachment device comprises an edge that is designed to scrape off ice from the first surface of the cooling element. The edge is thus preferably to be designed in such a manner that its shape corresponds to the shape of the first surface. For example, if the first surface is a planar straight surface, a planar and straight-line edge could be used to scrape ice from the first surface. In this manner, the quantity of ice that has accumulated on the first surface is always limited. Consequently, continuous adequate heat dissipation for the icing of water vapor of the gas is possible.

According to another embodiment of the apparatus, the cooling element is a hollow body. The first surface is an inside surface of the cooling element. In this manner, in particular, the introduction and the passing-through of gas is simplified because the cooling element by its hollow shape could practically represent an air line. By thermally connecting the cooling element with a heat sink, ice collects on the inside surface of the cooling element. This ice can be scraped off continuously, step-by-step or in an alternating manner.

The design of the cooling element in concrete terms provides a body that at least in some sections is of a hollow-cylindrical shape, because this variant is particularly easy to manufacture, and can thus reduce the costs for producing the apparatus to a low level.

With the use of a hollow cooling element, particularly with a design that at least in some sections comprises a hollow-cylindrical shape, in another embodiment of the apparatus it makes sense to use a spindle-shaped detachment device whose outer spindle edges are in contact with the inside surface of the cooling element. The spindle-shaped detachment device is preferably to be rotatably held on an axis that corresponds to the axis of extension of the cooling element. This concentric symmetric design makes possible uniform scraping-off on the entire inside surface. By means of continuous rotation of this spindle-shaped detachment device, which could, for example, comprise a helical scraping edge, ice is continuously scraped off the inside surface of the cooling element so that depending on the pitch and the number of helical turns of the detachment device the ice is removed immediately after it has collected on the inside of the cooling element.

The cooling element is enclosed by a further body, which on its inside forms a gap to the cooling element. Through such a gap a cooling medium could enter, which results in cooling of the cooling element. The temperature of the inflowing cooling medium or the like should comprise a value that is adequately lower than approximately 0° C. In this respect the embodiments are not limited to a particular type of cooling medium; instead, a number of different cooling media could be used. Both liquid and gaseous cooling media could be considered, where, in the use in an aircraft, ambient air from a ram air inlet or the like could also be suitable as a cooling medium, at least in cruise flight.

According to an embodiment of the apparatus, a hollow-shaped cooling element on at least on one end comprises an opening-out shape so that the introduction of the gas to be dried and/or the discharge of the detached ice are/is facilitated. The opening-out shape could, for example, be designed so as to be funnel-shaped or trumpet-shaped and could serve as a reservoir for ice or meltwater.

In an opening-out region of a hollow cooling element an aperture could be arranged through which the detached ice or the meltwater obtained from the outside in the frozen phase by the action of heat can be discharged. In this arrangement the action of heat can be implemented by the inflowing gas. In this arrangement the cooling element is preferably positioned in such a manner that mixing of the outflowing gas with the water to be discharged can be prevented. The apparatus could, for example, prevent this by horizontal support, because accumulated ice or accumulated meltwater could fall out or drip off perpendicularly to the direction of flow of the gas.

With the use of a spindle-shaped detachment device a drive device could be used that is arranged as far as possible outside axes of extension of the cooling element and of the detachment device so that the incident flow over the first surface of the cooling element is not impeded. For example, an electrical motor, optionally with a suitable gear arrangement, could be selected as a suitable drive. However, the embodiments are not limited to the use of an electric motor. Instead, in particular in an aircraft environment, a pneumatic or hydraulic drive device could also be considered. With the use of a planar first surface, linear guiding of a detachment device could be considered that uses a corresponding linear guide gear arrangement on the drive device. At the same time it would make sense to arrange a corresponding gear arrangement on the motor in order to reduce the rotational speed and to increase the torque of a spindle-shaped detachment device.

A method is also provided for gas drying, which method essentially comprises the following steps. In the first instance a gas stream that is to be dried is directed onto a first surface of a cooling element; with a thermal connection with a heat sink the cooling element is cooled in order to, in this process, freeze the water vapor or water content contained in the gas, so that the water vapor or water content accumulates on the first surface. At substantially the same time, the same time, subsequently or alternatingly, a detachment device on the first surface is moved so that the ice that has accumulated on the first surface is removed. Optionally, removed ice is collected in a reservoir, and, furthermore optionally, is melted by exposure to external heat. The ice collected in the reservoir can fall out of it or can be discharged from it; likewise the ice that has optionally been melted by exposure to heat can be channeled out.

BRIEF DESCRIPTION OF THE DRAWINGS

Further characteristics, advantages and application options are disclosed in the following description of the exemplary embodiments and of the figures. The described and/or illustrated characteristics per se and in any combination form the subject of the invention, even irrespective of their composition in the individual claims or their interrelationships. Furthermore, identical or similar components in the figures have the same reference characters.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
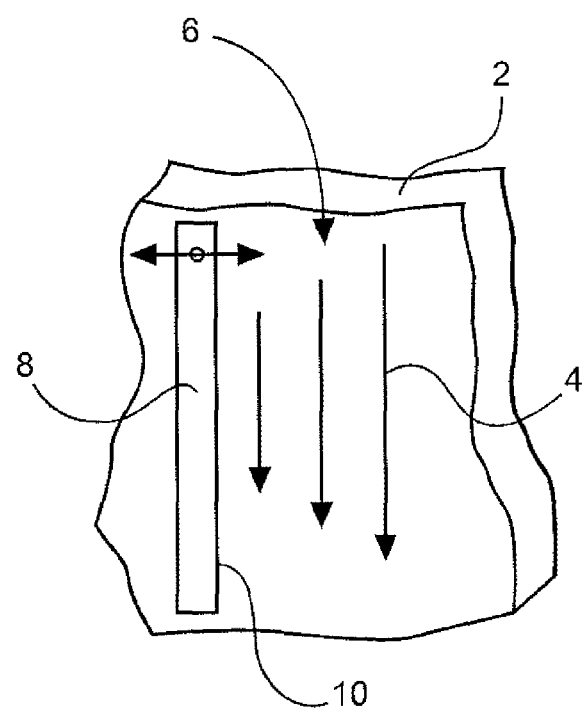
FIG. 1 shows a diagrammatic view of a first exemplary embodiment of the apparatus.

FIG. 1 shows a schematic diagram of the apparatus for drying exhaust gas of a fuel cell system. A cooling element 2 of any desired shape (for the sake of simplicity only shown in sections in the diagram) is cooled with a connection with a heat sink (not shown in the diagram). The temperature of the cooling element 2 is below approximately 0° C. so that freezing or sublimation of water vapor in a gas 4 to be dried can be achieved.

The cooling element 2 comprises a first surface 6, along which the gas 4 to be dried flows. The gas 4 comprises a defined content of water or water vapor that is to be discharged. As a result of the gas 4 flowing along the first surface 6 of the cooling element 2, the water freezes or sublimates and accumulates as a layer of ice on the first surface 6. The accumulation of ice cannot be carried out indefinitely, and for this reason a detachment device 8 is used that is held so as to be movable relative to the cooling element 2. For example, the detachment device 8 comprises a scraping edge 10 that is in contact with the first surface 6. As a result of the scraping edge 10 moving along the first surface 6, the ice is scraped off. With continuous movement of the detachment device 8 along the first surface 6, the surface 6 can always remain free of ice so that an ideal cooling effect can always act on the water content of the gas 4, and consequently continuous, ideal, dehumidification of the gas 4 can be carried out.

Figure 2:
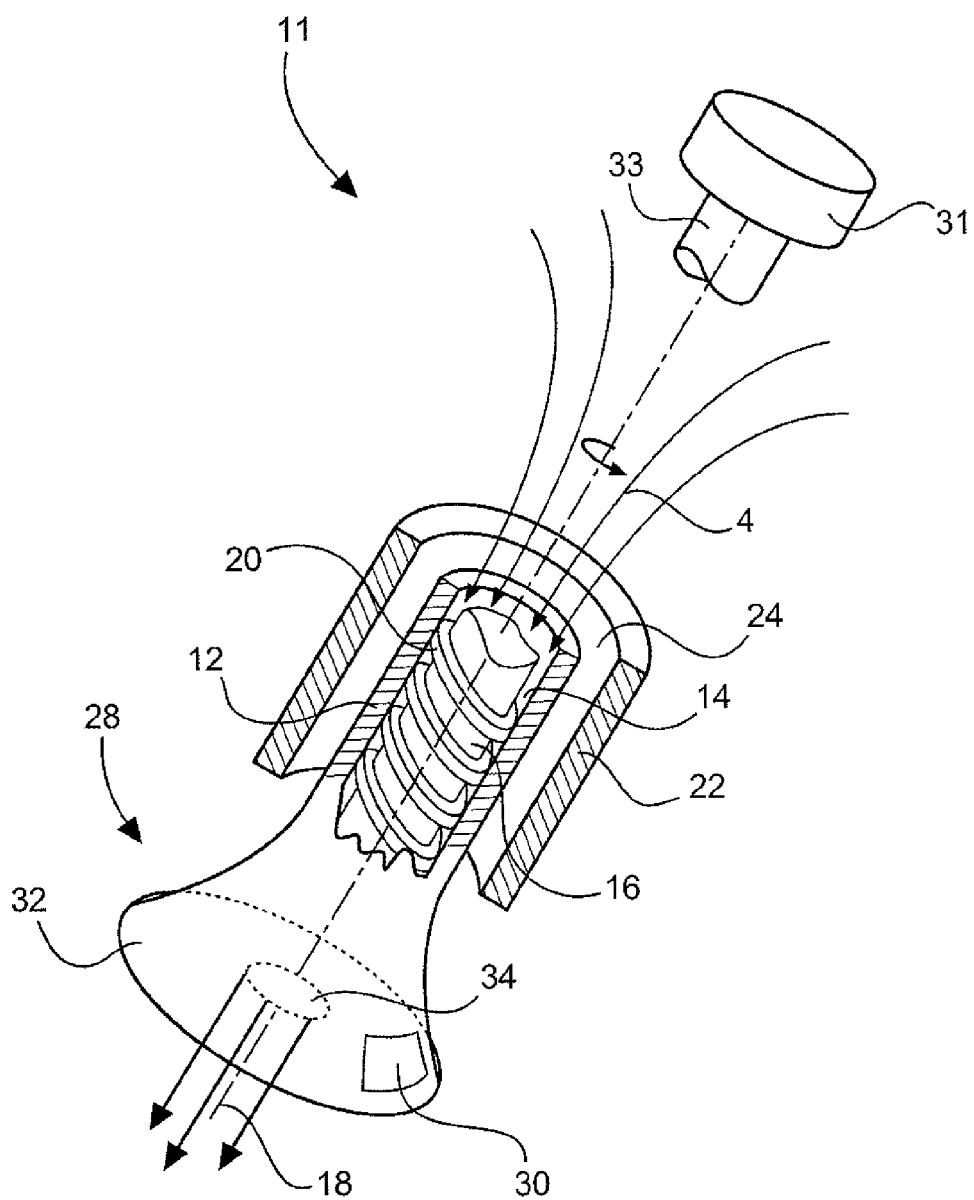
FIG. 2 shows a diagrammatic view of a second exemplary embodiment of the apparatus.

FIG. 2 shows a more concrete exemplary embodiment of the apparatus 11. In this arrangement a cooling element 12 is designed as a hollow cylinder through which the gas 4 to be dried flows. With adequate cooling, the first surface 14, designed as an inside surface of the cooling element, is covered by ice, and the gas 4 is dried as it flows through the cooling element 12. To remove the ice layer on the first surface 14 a detachment device 16 is used that is rotatably held on an axis 18, where the axis 18 corresponds to the axis of extension of the cooling element 12 and consequently is arranged concentrically to the aforesaid. The drive of the detachment device 16 is implemented by a diagrammatically shown drive device 31 which by way of a shaft 33 is connected with the detachment device 16, where the shaft 33 extends over a greater height than does the cooling element 12, and consequently the inflow of the gas 4 to be dried is made possible.

In this arrangement the detachment device 16 comprises a spiral-shaped or helical edge 20 that continuously scrapes along the first surface 14 of the cooling element 12 when the detachment device 16 is rotating. In this manner continuous detachment of ice from the first surface 14 is carried out.

Preferably, the detachment device 16 comprises a helical turn arrangement that is sufficiently coarse to allow easy flow of the gas 4 through the apparatus, while at the same time, however, ice detachment can remain assured.

In the embodiment shown, the hollow-cylindrically-shaped cooling element 12 is enclosed by a further cylindrically-shaped body 22 that defines a gap 24 to the cooling element 12. A cooling medium could flow through this gap 24, which cooling medium by passing along a second surface 26 of the cooling element 12 results in cooling as a result of which the water content of the gas 4 freezes on the first surface 14.

A lower region 28 of the cooling element 12 comprises an outward-expanding shape which, for example as a reservoir, provides sufficient space for accumulated ice that has been detached from the first surface 14. Optionally, a corresponding aperture 30 can be provided through which the ice, or ice in the form of meltwater, which ice has been melted by exposure to external heat, is discharged. The outward-formed region 28 of the cooling element 12 could comprise a cover 32 that in the extension of the axis 18 comprises a cutout 34 that allows unimpeded flowing out of the gas 4.

Figure 3A:
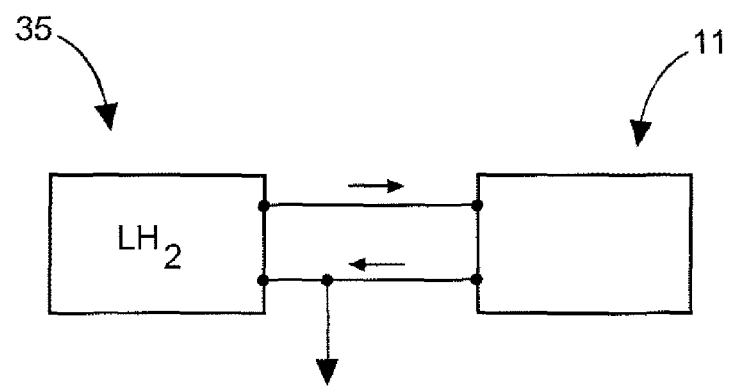
FIG. 3a and FIG. 3b show diagrammatic views of two cooling options for the apparatus according to an embodiment.

FIG. 3a diagrammatically shows apparatus 11, which apparatus is connected with a cryogenic hydrogen tank 35 filled with liquid hydrogen. Liquid hydrogen enters the gap 24, cools the cooling element 12, and is returned to the tank 35 or is conveyed for use in a fuel cell or the like.

Figure 3B:
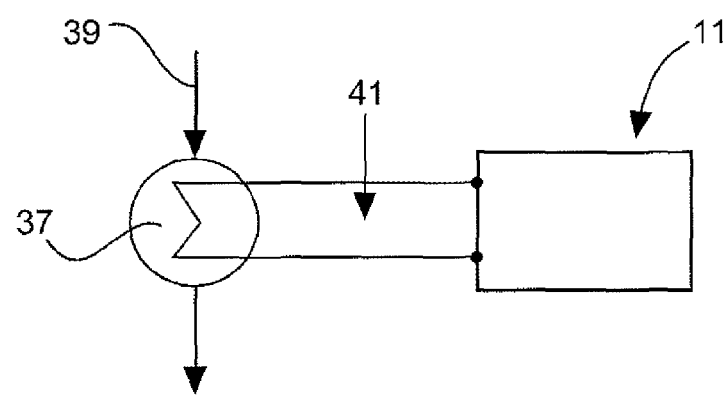

FIG. 3b diagrammatically shows a heat exchanger 37 that is cooled by ambient air 39. A separate cooling circuit 41 connects the heat exchanger 37 with the apparatus so that direct introduction of ambient air can be prevented. After use in the heat exchanger 37 the ambient air 39 can be removed. As an alternative, ambient air can also flow directly through the gap 24.

Figure 4:
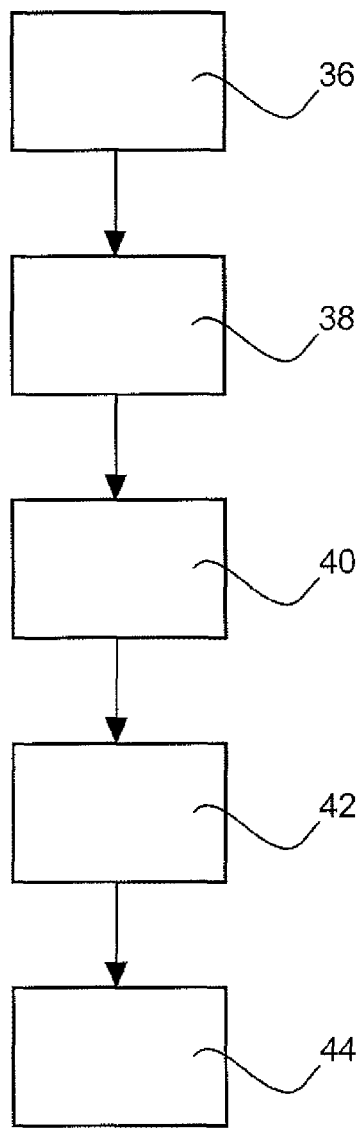
FIG. 4 shows a diagrammatic view of the method according to an embodiment.

Furthermore, FIG. 4 shows the essential steps of the method according to an embodiment. In the first instance a first surface of a cooling element is subjected 36 to a gas stream to be dried; by way of a thermal connection with a heat sink the cooling element is cooled 38 in order to, in this process, freeze the water vapor or water content contained in the gas so that the ice accumulates on the first surface. At the same time, subsequently or alternatingly, a detachment device on the first surface is moved 40 so that the ice that has accumulated on the first surface is removed. Optionally, removed ice is collected in a reservoir, and, furthermore optionally, is melted 42 by exposure to external heat. The ice collected in the reservoir can fall out of it or can be discharged 44 from it; likewise the ice that has optionally been melted by exposure to heat can be channeled out.

Figure 5:
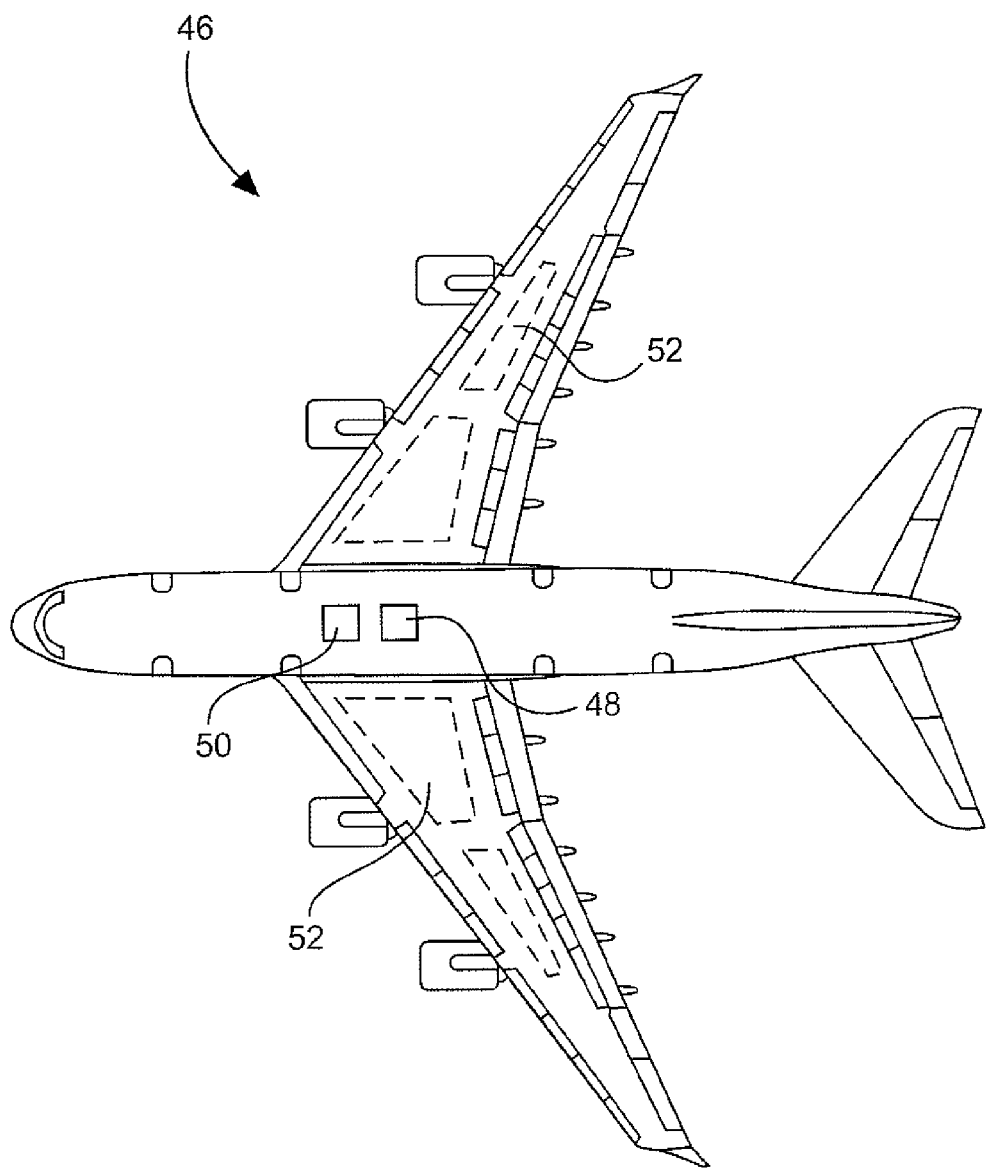
FIG. 5 shows an aircraft with at least one fuel cell and at least one apparatus according to an embodiment for drying the exhaust gas of the layer composition.

Finally, FIG. 5 shows an aircraft 46 comprising at least one fuel cell system 48 that feeds into fuel tanks 52 an exhaust gas containing water vapor through apparatus 50 in a dried state for rendering inert said fuel tanks 52.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A fuel cell system having an apparatus for drying an exhaust gas of the fuel cell system, comprising:
   at least one cooling element with at least one first surface, the at least one cooling element thermally connected to a heat sink and contacts the exhaust gas of the fuel cell system that is flowing past the at least one cooling element to dry the exhaust gas of the fuel cell system; and
   at least one detachment device movably held relative to the at least one first surface and movable relative to the at least one first surface to detach frozen water from the at least one first surface.

2. The fuel cell system of claim 1,
   wherein the at least one detachment device comprises an edge that is configured to scrape off ice from the at least one first surface.

3. The fuel cell system of claim 1, further comprising a drive device coupled to the at least one detachment device.

4. The fuel cell system of claim 1,
   wherein the at least one cooling element is a hollow body, and
   wherein the at least one first surface is an inside surface of the at least one cooling element.

5. The fuel cell system claim 1,
   wherein the at least one cooling element is a hollow cylinder in at least sections, and
   wherein the at least one first surface is an inner lateral surface of the at least one cooling element.

6. The fuel cell system of claim 4, wherein the at least one detachment device is spindle-shaped with an outer spindle edge in contact with the inside surface of the at least one cooling element, and rotatably held on an axis that is rigid relative to the at least one cooling element.

7. The fuel cell system of claim 1, further comprising a hollow body that encloses the at least one cooling element that forms a gap for a fluid to flow through.

8. The fuel cell system of claim 4, wherein the at least one cooling element on at least one end comprises an opening-out region.

9. The fuel cell system of claim 1,
   wherein the heat sink comprises hydrogen from a cryogenic hydrogen tank.

10. An aircraft, comprising:
    at least one fuel tank;
    at least one fuel cell system connected with the at least one fuel tank such that an exhaust gas from the at least one fuel cell system is configured to render inert the at least one fuel tank; and
    at least one apparatus for drying the exhaust gas of the at least one fuel cell system, comprising:
    at least one cooling element with at least one first surface, the at least one cooling element thermally connected to a heat sink and contacts with the exhaust gas of the at least one fuel cell system flowing past the at least one cooling element for drying the exhaust gas of the fuel cell system; and
    at least one detachment device movably held relative to the at least one first surface and movable relative to the at least one first surface to detach frozen water from the at least one first surface.

11. The aircraft of claim 10, further comprising a cryogenic hydrogen tank,
    wherein the heat sink comprises cryogenic hydrogen.

12. The aircraft of claim 10,
    wherein the at least one detachment device comprises an edge that is configured to scrape off ice from the at least one first surface.

13. The aircraft of claim 10, further comprising a drive device coupled to the at least one detachment device.

14. The aircraft of claim 10,
    wherein the at least one cooling element is a hollow body, and
    wherein the at least one first surface is an inside surface of the at least one cooling element.

15. The aircraft of claim 10,
    wherein the at least one cooling element is a hollow cylinder in at least sections, and
    wherein the at least one first surface is an inner lateral surface of the at least one cooling element.

16. The aircraft of claim 14, wherein the at least one detachment device is spindle-shaped with an outer spindle edge in contact with the inside surface of the at least one cooling element, and rotatably held on an axis that is rigid relative to the at least one cooling element.

17. The aircraft of claim 15, further comprising a hollow body that encloses the at least one cooling element and forms a gap for a fluid to flow through.

* * * * *